March 30, 1965   A. H. CROUCHER   3,175,818
HYDRAULIC BUFFERS
Filed Dec. 26, 1962
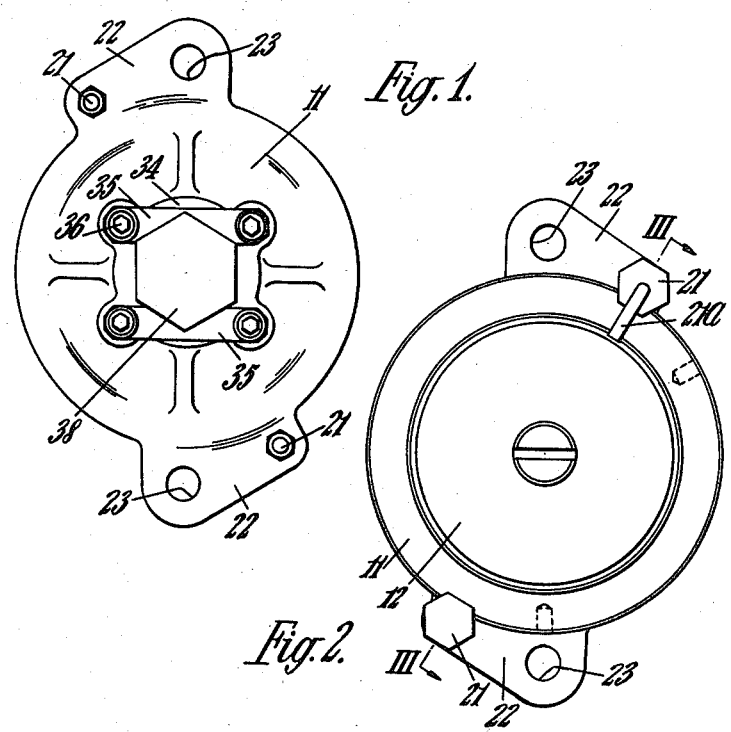
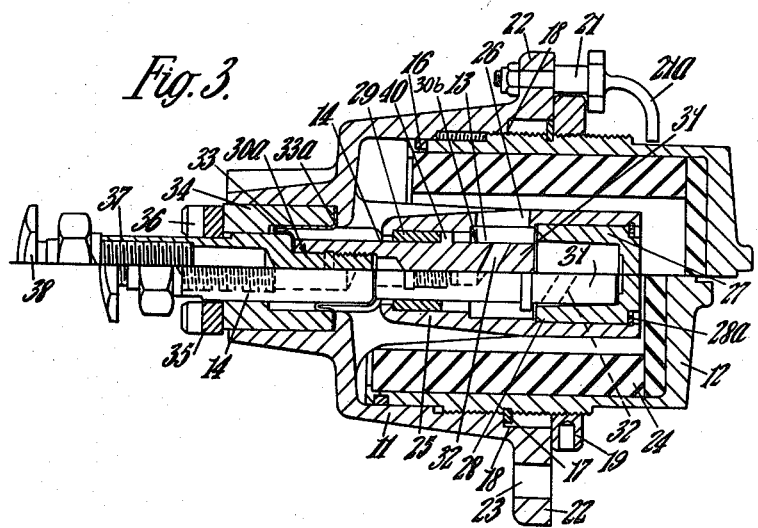

3,175,818
HYDRAULIC BUFFERS
Antony Harry Croucher, Esher, Surrey, England, assignor to Wildt Mellor Bromley Limited, Leicester, England
Filed Dec. 26, 1962, Ser. No. 247,196
Claims priority, application Great Britain, Jan. 3, 1962, 233/62
11 Claims. (Cl. 267—1)

This invention relates to squelch type buffers or shock absorbers of the self-recuperating hydraulic type, more particularly, but not solely, for use as loom buffers.

In one type of self-recuperating hydraulic buffer, air at pressure above one atmosphere is charged into the buffer housing through a conventional valve to fill the space above the oil. In using such a buffer on looms, wherein the housing is frequently of necessity mounted on an oscillating part of the mechanism, this arrangement has been found unsuitable in that the oil and air tend to emulsify, and this has a deleterious effect on the buffer as the oil then becomes significantly compressible. Also the air tends to leak out of the valve.

According to the present invention these disadvantages are overcome by using a body of closed cell expanded rubber or like material within the housing of the buffer, which body is compressed before or during assembly of the buffer to provide the desired over-pressure.

Thus if the buffer is assembled so as to exclude or drive out air from the interior of the housing, the oil is provided with an over-pressure which does not vary by leakage of air and which does not introduce the risk of forming an air/oil emulsion.

Preferably, the housing comprises two telescopically adjustable parts whereby the volume of the interior of the housing may be varied to comprise or release the said body.

Conveniently, the spindle extending out of the housing is sealed by a flexible diaphragm seal in rolling engagement with the spindle and part of the housing.

The invention will be further described with reference to the accompanying drawings, wherein:

FIGURE 1 is a front elevation of a preferred form of buffer according to the invention;

FIGURE 2 is a rear elevation thereof; and

FIGURE 3 is a section on the line III—III of FIGURE 2.

The drawings show that the housing of the buffer includes two threadedly engaged parts 11 and 12. It will be noted that the upper and lower halves of FIGURE 3 represent differing positions of part 12 in relation to part 11 and also that the position of a plunger 13 and spindle 14 differs between the two halves, being shown in the normal position in the upper half and in the depressed position in the lower half.

The gap between parts 11 and 12 is sealed by a sealing ring 16, and the part 12 carries a retaining ring 17 to limit the adjustment by abutting either a shoulder 18 or part 11 or a lock nut 19 as shown in the lower and upper halves of FIGURE 3 respectively. The lock nut is retained against inadvertent removal by a pair of headed pins 21 attached to flanges 22 on the part 11. The flanges also include mounting holes 23.

The housing part 12 carries a body 24 of closed cell expanded rubber or the like forming a thick lining thereto. The body 24 may be built up of rings and a disc of expanded rubber, may be in one piece or may be a sleeve and a disc as illustrated.

The part 11 includes an integral internal stepped sleeve 25, having a series of slots 26 to allow oil from within the body to enter a cup 27 retained in the sleeve 25 between a shoulder 28 and a spring retaining ring 28a. The sleeve also includes a bushing 29 supporting the spindle 14 forming part of the buffer plunger 13 of which the head 31 is adapted to enter the cup 27, which is tapered as illustrated to provide a generally conventional squelch action.

The spindle 14 is in two threadedly engaged parts 30a and 30b and a bore 32 is provided in part 30b to enable the part 30b to be retained against rotation by a suitable tool inserted through one slot 26 during assembly of the spindle. One edge of a rolling diaphragm seal 33 is retained between the parts 30a and 30b and the other edge is retained against the housing part 11 by a sleeve 34 retained by bars 35 and bolts 36. The spindle part 30a is formed with a flat 37 cooperating with one bar 35 to prevent rotation of the spindle, which would deleteriously affect the diaphragm seal 33. The spindle part 30a has a hexagon headed stud 38 threadedly received therein.

The spindle is formed with an annular rib 40 which cooperates with the bushing 29 to prevent excess return movement.

To assemble the buffer in such a manner as to exclude free air from the sealed housing, the following procedure is adopted.

The two spindle parts 30a and 30b are assembled together in the housing part 11 with the inner edge of the seal 33 between them, the cup 27 being already in position. The seal 33 is then in a position such that it conforms closely to the spindle part 30a and has an outturned flange 33a ready for engagement by the sleeve 34. The housing part 12 is then filled with oil, introduced into the part 11, and carefully screwed home until oil starts to leak past the flange 33a of seal 33 which is still open. After slight agitation to ensure there are no air bubbles still entrapped the sleeve 34 may be pressed down to seal the diaphragm seal and tightened down by bars 35 and nut 36. The housing is now sealed by seals 33 and 16 and further screwing home of the housing parts 12 reduces the volume of the housing and since the oil is incompressible this causes compression of the expanded rubber body 24. When the desired degree of over-pressure has been achieved by this means the lock nut 19 is threaded on and secured by pins 21.

If desired a scale of pressures may be marked on the housing part 12 to be juxtaposed to a pointer 21a fixed on the housing part 11, e.g. an extension of pin 21 so that the pressure may be read off as adjustment.

The action of the buffer is generally conventional in that there is a squelch action between the tapered cup 27 and the head 31. Self-recuperating pressure is provided by the body 24 in a compressed state. The rib 40 also provides a dash pot effect on the recuperation stroke.

The construction described provides an efficient buffer free from air leaks and consequent loss of pressure, and with no risk of emulsifying the oil with air which is particularly suitable as a loom buffer, but its use is not so limited.

Various modifications may be made within the scope of the invention.

The body 24 need not be of the shape illustrated but may be of any shaped and incorporated in any convenient position within the housing. For example, the end disc of body 24 may be omitted so that the body 24 consists of a sleeve or a series of rings.

Also the sleeve 34 may be directly secured to the housing part 11, and may be formed with a surface for engaging the flat 37 to restrain the spindle against rotation.

Further, the spindle may be hollow, rather than the generally solid parts illustrated.

I claim:
1. A self-recuperating hydraulic shock absorber comprising a housing including a sealed chamber, a plunger extending from outside the housing into the said chamber, a tapered cup in the said chamber for hydraulically decelerating and cushioning the said plunger by a squelch action upon depression of the plunger into the housing and chamber, and a body of expanded closed cell elastomeric material in a compressed state in the said chamber, the free space within the said chamber being filled with liquid to the exclusion of air whereby the compressed body of elastomeric material acts as a source of over pressure within the chamber to urge the plunger outwards therefrom during recuperation of the shock absorber.

2. A self-recuperating hydraulic shock absorber comprising a housing, the said housing being at least partially formed by telescopically related mutually adjustable parts defining a chamber of variable volume within the housing, means for sealing the said chamber, a plunger extending from outside the housing into the said chamber, a tapered cup in the said chamber for hydraulically decelerating and cushioning the said plunger by a squelch action upon depression of the plunger into the chamber, and a body of expanded closed cell elastomeric material in a compressed state in the said chamber, the free space within the chamber being filled with liquid whereby the compressed body of elastomeric material acts as a source of over pressure within the chamber to urge the plunger outwards therefrom during recuperation of the shock absorber.

3. A shock absorber as claimed in claim 2, in which the body is compressed by reduction of the volume of the chamber after filling and sealing thereof by adjustment of the telescopically related parts.

4. A shock absorber as claimed in claim 2, in which the inner of said telescopically related parts carries the said body of elastomeric material as a thick lining thereto.

5. A shock absorber as claimed in claim 4, in which the end of the lining adjacent the outer end of the said inner part is closed by a cap of closed cell expanded elastomeric material.

6. A self-recuperating hydraulic shock absorber comprising a housing defining a sealed chamber, a plunger extending from outside the housing into the said chamber, a sealing surface on said housing adjacent said plunger, a flexible diaphragm seal in rolling engagement with the plunger and the said sealing surface, a tapered cup in the said chamber for hydraulically decelerating and cushioning the said plunger by a squelch action upon depression of the plunger into the housing and chamber, and a body of expanded closed cell elastomeric material in a compressed state in the said chamber, the free space within the said chamber being filled with liquid whereby the compressed body of elastomeric material acts as a source of over pressure within the chamber to urge the plunger outwards therefrom during recuperation of the shock absorber.

7. A self-recuperating hydraulic shock absorber comprising a housing, the said housing being formed by telescopically related parts defining a chamber of variable volume within the housing, means for sealing the said chamber, a plunger extending from outside the housing into the said chamber, means in the said chamber for hydraulically decelerating and cushioning the said plunger upon depression thereof into the chamber, and a body of expanded closed cell elastomeric material in a compressed state in said chamber, said body being carried by the inner of said telescopically related parts as a thick lining thereto, the free space within the chamber being filled with liquid whereby the compressed body of elastomeric material acts as a source of over pressure within the chamber to urge the plunger outwards therefrom during recuperation of the shock absorber.

8. A shock absorber as claimed in claim 7, in which the end of the lining adjacent the outer end of the said inner part is closed by a cap of closed cell expanded elastomeric material.

9. A self-recuperating loom buffer, comprising a housing including a sealed chamber, a plunger extending from outside the housing into the said chamber, a tapered cup in the said chamber for hydraulically decelerating and cushioning the said plunger by a squelch action upon depression of the plunger into the housing and chamber, and a body of expanded closed cell elastomeric material in a compressed state in the said chamber, the free space within the said chamber being filled with liquid to the exclusion of air whereby the compressed body of elastomeric material acts as a source of over pressure within the chamber to urge the plunger outwards therefrom during recuperation of the shock absorber.

10. A self-recuperating loom buffer, comprising a housing, the said housing being at least partially formed by telescopically related mutually adjustable parts defining a chamber of variable volume within the housing, means for sealing the said chamber, a plunger extending from outside the housing into the said chamber, a tapered cup in the said chamber for hydraulically decelerating and cushioning the said plunger by a squelch action upon depression of the plunger into the chamber, and a body of expanded closed cell elastomeric material in a compressed state in the said chamber, the free space within the chamber being filled with liquid whereby the compressed body of elastomeric material acts as a source of over pressure within the chamber to urge the plunger outwards therefrom during recuperation of the shock absorber.

11. A self-recuperating hydraulic shock absorber comprising a housing including a sealed chamber, a plunger extending from outside the housing into the said chamber, a cup in the said chamber to co-operate with the plunger upon depression thereof into the housing and chamber to hydraulically decelerate and cushion the plunger by a squelch action, and a body of expanded closed cell elastomeric material in a compressed state in the said chamber, the free space within the said chamber being filled with liquid whereby the compressed body of elastomeric material acts as a source of over pressure within the chamber to urge the plunger outwards therefrom during recuperation of the shock absorber.

References Cited by the Examiner

UNITED STATES PATENTS

| 1,886,712 | 11/32 | Messier | 267—64 |
| 2,856,035 | 10/58 | Rohacs | 188—100 X |
| 3,027,152 | 3/62 | Deschner | 267—1 |
| 3,070,363 | 12/62 | Ellis | 267—35 X |

FOREIGN PATENTS

| 849,044 | 9/52 | Germany. |
| 377,816 | 8/32 | Great Britain. |

ARTHUR L. LA POINT, *Primary Examiner.*